(12) United States Patent
Theron et al.

(10) Patent No.: US 8,795,527 B2
(45) Date of Patent: Aug. 5, 2014

(54) FILTRATION SYSTEM

(75) Inventors: Douglas Arnoldus Theron, Kilmarnock (GB); Anthony John McMonagle, Auchengree (GB); Mark Albert McNulty, Kilmarnock (GB); Scott Alexander Barrie, East Kilbride (GB)

(73) Assignee: H2Oil & Gas Ltd, Irvine (GB)

( * ) Notice: Subject to any disclaimer, the term of this patent is extended or adjusted under 35 U.S.C. 154(b) by 239 days.

(21) Appl. No.: 12/525,938

(22) PCT Filed: Feb. 4, 2008

(86) PCT No.: PCT/GB2008/000377
§ 371 (c)(1),
(2), (4) Date: Nov. 18, 2009

(87) PCT Pub. No.: WO2008/096108
PCT Pub. Date: Aug. 14, 2008

(65) Prior Publication Data
US 2010/0133183 A1    Jun. 3, 2010

(30) Foreign Application Priority Data
Feb. 6, 2007    (GB) .................................. 0702214.8

(51) Int. Cl.
*B01D 61/02*    (2006.01)
*B01D 65/02*    (2006.01)

(52) U.S. Cl.
CPC .............. *B01D 65/02* (2013.01); *B01D 61/022* (2013.01); *B01D 2321/02* (2013.01)
USPC .................................. 210/333.01; 210/321.69

(58) Field of Classification Search
CPC .......................... B01D 61/022; B01D 2327/02
USPC ........................................ 210/321.72, 333.01
See application file for complete search history.

(56) References Cited

U.S. PATENT DOCUMENTS

| 5,037,547 A | 8/1991 | Burrows |
| 5,207,916 A | 5/1993 | Goheen et al. |

(Continued)

FOREIGN PATENT DOCUMENTS

| EP | 0 443 257 A1 | 8/1991 |
| WO | WO 97/38786 A1 | 10/1997 |

(Continued)

OTHER PUBLICATIONS van Hoof et al., "Dead-End Ultrafiltration as Alternative Pre-Treatment to Reverse Osmosis in Seawater Desalination: A Case Study", *Desalination*, 139:161-168 (2001).

(Continued)

*Primary Examiner* — Tony G Soohoo
*Assistant Examiner* — Peter Keyworth
(74) *Attorney, Agent, or Firm* — Tarolli, Sundheim, Covell & Tummino LLP (57) ABSTRACT

A filtration system includes a vessel for housing at least two filtration elements. One or more of the filtration elements is a reverse osmosis membrane or a nanofiltration membrane and one of the other filtration elements is a microfiltration or ultrafiltration membrane. The vessel has an inlet port for providing a liquid feed to the filtration elements, an outlet port for directing a permeate produced by the elements from the vessel and an outlet port for directing a concentrate produced by the elements from the vessel. A number of vessels can be provided in a parallel arrangement and/or a series arrangement and the vessels can be arranged so as to allow regeneration of the microfiltration or ultrationfiltration membranes from another vessel in the arrangement.

16 Claims, 7 Drawing Sheets

Key -
A - HP feed inlet
B - Reverse flow outlet
C - Reverse flow inlet
D - Concentrate stream
E - Permeate stream

(56) References Cited

U.S. PATENT DOCUMENTS

| | | | |
|---|---|---|---|
| 5,830,347 A * | 11/1998 | Vollmer | 210/107 |
| 2001/0030157 A1* | 10/2001 | Olapinski et al. | 210/650 |
| 2003/0178366 A1* | 9/2003 | Boye | 210/636 |
| 2004/0164006 A1 | 8/2004 | Brown et al. | |
| 2005/0029192 A1* | 2/2005 | Arnold et al. | 210/641 |
| 2006/0266680 A1* | 11/2006 | Phagoo et al. | 210/97 |
| 2007/0181496 A1* | 8/2007 | Zuback | 210/636 |

FOREIGN PATENT DOCUMENTS

| | | |
|---|---|---|
| WO | WO 97/47375 A1 | 12/1997 |
| WO | WO 03/039708 A1 | 5/2003 |
| WO | WO 03/080225 A1 | 10/2003 |
| WO | WO-2004/106697 A1 | 12/2004 |
| WO | WO 2005/092799 A1 | 10/2005 |
| WO | WO 2005/105274 A1 | 11/2005 |

OTHER PUBLICATIONS van Hoof et al., "The Effect of Ultrafiltration as Pretreatment to Reverse Osmosis in Wastewater Reuse and Seawater Desalination Applications", *Desalination*, 124:231-242 (1999).

Durham et al., "Membranes as Pretreatment to Desalination in Wastewater Reuse: Operating Experience in the Municipal and Industrial Sectors", *Desalination*, 138:83-90 (2001).

* cited by examiner

Improved System Layout:

Using 8" membrane housings:

Plan View:
Prior Art 6 element membrane vessels located end to end with maintenance access

| Unit length/Width | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | Space | 1 | 2 | 3 | 4 | 5 | 6 | Space | Space | 1 | 2 | 3 | 4 | 5 | 6 | Spa |
| 2 | Space | 1 | 2 | 3 | 4 | 5 | 6 | Space | Space | 1 | 2 | 3 | 4 | 5 | 6 | Spa |
| 3 | Space | 1 | 2 | 3 | 4 | 5 | 6 | Space | Space | 1 | 2 | 3 | 4 | 5 | 6 | Spa |
| 4 | Space | 1 | 2 | 3 | 4 | 5 | 6 | Space | Space | 1 | 2 | 3 | 4 | 5 | 6 | Spa |
| 5 | Space | 1 | 2 | 3 | 4 | 5 | 6 | Space | Space | 1 | 2 | 3 | 4 | 5 | 6 | Spa |
| 6 | Space | 1 | 2 | 3 | 4 | 5 | 6 | Space | Space | 1 | 2 | 3 | 4 | 5 | 6 | Spa |

Present invention using 8 element vessels

| | 1 | 2 | 3 | 4 | 5 | 6 | 7 | 8 | |
|---|---|---|---|---|---|---|---|---|---|
| 1 Space | 1 | 2 | 3 | 4 | 5 | 6 | 7 | 8 | Space |
| 2 Space | 1 | 2 | 3 | 4 | 5 | 6 | 7 | 8 | Space |
| 3 Space | 1 | 2 | 3 | 4 | 5 | 6 | 7 | 8 | Space |
| 4 Space | 1 | 2 | 3 | 4 | 5 | 6 | 7 | 8 | Space |
| 5 Space | 1 | 2 | 3 | 4 | 5 | 6 | 7 | 8 | Space |
| 6 Space | 1 | 2 | 3 | 4 | 5 | 6 | 7 | 8 | Space |
| 7 Space | 1 | 2 | 3 | 4 | 5 | 6 | 7 | 8 | Space |
| 8 Space | 1 | 2 | 3 | 4 | 5 | 6 | 7 | 8 | Space |
| 9 Space | 1 | 2 | 3 | 4 | 5 | 6 | 7 | 8 | Space |

Unit length/width: 1 2 3 4 5 6 7 8 9 10

Elevation View

Prior Art 6 element
Unit length/Height

Present Invention 8 element
Unit length/Height

Fig. 7

Total Volume of the systems:

Package Volume

|   | Prior Art | Present Invention |
|---|---|---|
| L | 16 | 10 |
| H | 11 | 11 |
| W | 6 | 9 |
| Vol | 1056 | 990 |

Using 16" diameter membrane housings:
Prior Art 16" vessel with 6 elements per vessel located end to end

| Unit length / Width | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | Space | 1 | 2 | 3 | 4 | 5 | 6 | Space | Space | 1 | 2 | 3 | 4 | 5 | 6 | Space |
| 2 | Space | 1 | 2 | 3 | 4 | 5 | 6 | Space | Space | 1 | 2 | 3 | 4 | 5 | 6 | Space |
| 3 | Space | 1 | 2 | 3 | 4 | 5 | 6 | Space | Space | 1 | 2 | 3 | 4 | 5 | 6 | Space |
| 4 | Space | 1 | 2 | 3 | 4 | 5 | 6 | Space | Space | 1 | 2 | 3 | 4 | 5 | 6 | Space |
| 5 | Space | 1 | 2 | 3 | 4 | 5 | 6 | Space | Space | 1 | 2 | 3 | 4 | 5 | 6 | Space |
| 6 | Space | 1 | 2 | 3 | 4 | 5 | 6 | Space | Space | 1 | 2 | 3 | 4 | 5 | 6 | Space |

Prior Art 16" vessel with 8 elements per vessel

| Unit length / Width | 1 | 2 | 3 | 4 | 5 | 6 | 7 | 8 | 9 | 10 |
|---|---|---|---|---|---|---|---|---|---|---|
| 1 | Space | 1 | 2 | 3 | 4 | 5 | 6 | 7 | 8 | Space |
| 2 | Space |   |   |   |   |   |   |   |   | Space |
| 3 | Space | 1 | 2 | 3 | 4 | 5 | 6 | 7 | 8 | Space |
| 4 | Space |   |   |   |   |   |   |   |   | Space |
| 5 | Space | 1 | 2 | 3 | 4 | 5 | 6 | 7 | 8 | Space |
| 6 | Space |   |   |   |   |   |   |   |   | Space |
| 7 | Space | 1 | 2 | 3 | 4 | 5 | 6 | 7 | 8 | Space |
| 8 | Space |   |   |   |   |   |   |   |   | Space |

Fig. 7 (cont'd)

Elevation View

Total Volume of the two systems using 16" vessels:

| Package Volume | Prior Art 16" | Present Invention 16" |
|---|---|---|
| L | 16 | 10 |
| H | 8 | 6 |
| W | 7 | 8 |
| Vol | 896 | 480 |

Comparison of system volumes:

| Sytem | Prior art 8" | Present Invention 8" | Prior art 16" | Present Invention 16" |
|---|---|---|---|---|
| Volume (units) | 1056 | 990 | 896 | 480 |

Fig. 7 (cont'd)

FILTRATION SYSTEM

CROSS-REFERENCE TO RELATED APPLICATION

This application corresponds to International Application No. PCT/GB2008/000377, filed Feb. 4, 2008, which claims benefit of British Application No. 0702214.8, filed Feb. 6, 2007, all of which are incorporated herein in their entirety by reference thereto.

FIELD OF THE INVENTION

The present invention relates to filtration membrane systems. In particular, the present invention relates to nanofiltration and reverse osmosis membrane systems.

BACKGROUND OF THE INVENTION

Although many systems exist in the art for reducing total dissolved salts from water, many of these systems suffer from a number of disadvantages.

For example, one existing method for water treatment involves transferring the water through a number of graded beds of filtration media. This acts as a pre-treatment for the water. However, media beds typically have a large footprint and can be of significant weight. Both of these factors mean that media bed filtration may be unsuitable and/or uneconomic to run in many applications, such as offshore applications where space and weight capacity are limited. Furthermore, it has been found that the quality of output from media bed filtration systems can vary significantly leading to fouling of the membranes which impairs filtration performance.

More recently, microfiltration or ultrafiltration systems have been developed to remove particulate matter, the product of which is then pumped through a series of nanofiltration or reverse osmosis filters. This process has been found to be energy intensive, especially if high pressure pumps are used, as are often required.

An object of embodiments of the present invention is to provide a filtration system which obviates or mitigates disadvantages of existing systems.

SUMMARY OF THE INVENTION

According to a first aspect of the present invention there is provided a filtration system comprising:

a vessel containing at least two filtration elements, the vessel comprising: an inlet port adapted to provide a liquid feed to the at least two filtration elements; at least one outlet port for directing a permeate produced by the elements from the vessel; and at least one outlet port for directing a concentrate produced by the elements from the vessel, wherein one or more of the at least two filtration elements comprises a reverse osmosis membrane or a nanofiltration membrane and wherein one of the other at least two filtration elements comprises a microfiltration or ultrafiltration membrane.

The basic principle of operation of the reverse osmosis membranes is based on providing a driving pressure that exceeds the osmotic pressure of the fluid being treated. For example, seawater has a higher osmotic pressure than brackish water and therefore requires a higher pressure to "squeeze" the fresh water out of solution, through the membrane but with salts remaining in the concentrate.

For nanofiltration, a form of molecular filtration occurs, with pore size being smaller than most divalent ions.

The system may be adapted to split the liquid feed between the at least two filtration elements. For example, the inlet port may be arranged to feed liquid into the vessel such that the liquid feed is split into substantially equal portions. The system may be adapted to split the liquid feed in substantially opposite directions along the vessel. Alternatively, the inlet port may be located at any point along the vessel and may split the liquid feed into any appropriate amounts. For example, the liquid feed may be split in a ratio of 2:1, 3:1 or 4:1 in any direction.

Any suitable means for splitting the liquid feed may be used. For example, the vessel may be shaped to split the liquid feed between the at least two filtration elements. Alternatively, or in addition, the system may include a funnel and/or a pipe-based system for splitting the liquid feed between the at least two filtration elements.

The inlet port may be located on the vessel between the at least two filtration elements.

A space may be defined between the at least two filtration elements, and the space may be adapted to receive liquid feed from the inlet port. The space may range from about 0.1 cm to about 10 cm.

The inlet port may be adapted to provide a direct liquid feed to the at least two filtration elements.

The membranes may be of any suitable size or shape, but a circular cross-section is preferred. One or more of the filtration elements may comprise an eight inch diameter (203.2 mm) filtration membrane. Alternatively, or in addition, one or more of the filtration elements may comprise a sixteen inch diameter (406.4 mm) filtration membrane. Use of a sixteen inch diameter (406.4 mm) filtration membrane may provide an improved storage space by reducing the footprint of the system. In particular embodiments, the filtration elements may be substantially cylindrical.

The filtration elements may be adapted to fit snugly inside the vessel. This may assist in preventing leakage around the filtration elements. For example, the filtration elements may be adapted to fit inside the vessel by an interference fit. Alternatively, the system may comprise attachment means for securing the filtration elements inside the vessel.

The system may further include a sealing element to assist in preventing liquid leakage around the edges around the or each filtration element.

The filtration elements may comprise any suitable type of filter, membrane or the like. For example, the at least two filtration elements may include a polymer based material.

A surface of the at least two filtration elements may be adapted to be negatively charged.

The vessel may comprise any suitable hollow member. In particular embodiments, the vessel may be a substantially tubular member. The internal diameter of the vessel may be substantially constant or may be shaped to facilitate the flow and/or splitting of the liquid feed.

The vessel may be made from any suitable material for example, the vessel may be constructed from at least one or a combination of a plastics, composite or alloy material.

The vessel may be of any suitable length and may have a length of multiple meters. In particular embodiments, the vessel may have a length in the range of about 2 meters to about 8 meters.

The system may be used to reduce the concentration of ions in the liquid feed. In particular, the filtration elements may be adapted to filter the liquid feed by reducing the concentration of ions in the liquid feed.

The filtration elements may be adapted to filter the liquid feed by reducing the concentration of contaminating ions in the liquid feed.

The concentration of ions may be reduced by passing the liquid through the filtration elements. The membranes have the function of removing and/or substantially reducing the concentration of ions in the liquid feed and providing a purified form of the liquid in the permeate.

At least some of the ions may be monovalent. Alternatively, or in addition, at least some of the ions may be divalent.

The ions may be salt ions. Accordingly, the system may be used to reduce the salt concentration of any species by RO or nanofiltration. Nanofiltration systems are particularly suitable for removing divalent ions.

The ions may comprise a single type of salt ion. Alternatively, the ions may comprise a combination of different types of salt ions.

The ions may be a type of metal, inorganic or organic based salt. In the case of metal based salts, the metals forming the salts may be selected from any one of or a combination of any of the following: Na, K, Ca, Mg, Mn, Ba, Sr, B, Li, Be and Al.

The ions to be removed from the liquid feed which form the negatively charged part of the metal based salt may be selected from any one of or a combination of any of the following: Cl, $SO_4$, $NO_3$, $PO_4$, F, $HCO_3$, Br, I and $SO_3$.

The liquid feed may comprise ions in a concentration of less than or about any of the following: 45000 ppm; about 40000 ppm; about 35000 ppm; about 30000 ppm; about 25000 ppm; about 20000 ppm; about 15000 ppm; about 10000 ppm; about 5000 ppm; about 2500 ppm; or about 1000 ppm.

The filtration elements may be adapted to reduce the concentration of ions in the liquid feed by about 20%, about 30%, about 40%, about 50%, about 60%, about 70%, about 80%, about 90%, about 95% or about 99% on passing the liquid feed through the filtration system.

The concentration of ions may be reduced down to less than or about any of the following: about 20000 ppm; about 15000 ppm; about 10000 ppm; about 5000 ppm; about 2500 ppm; about 1000 ppm; about 500 ppm; about 400 ppm; about 300 ppm; about 200 ppm; about 100 ppm; about 50 ppm; about 40 ppm; about 30 ppm; about 20 ppm; about 10 ppm; or about 5 ppm.

In particular embodiments, the liquid feed may comprise about 2800 ppm $SO_4$ and/or about 1000 ppm to about 45000 ppm total dissolved salts.

The filtration elements may be adapted to reduce the concentration of ions to about <50 ppm $SO_4$ and/or about <1000 ppm total dissolved salts.

The system may comprise a plurality of the vessels.

In particular embodiments, concentrate from at least one of the vessels in the system may be fed to a further vessel in the system. The process may be repeated as many times as necessary providing a plurality of purification steps.

For example, the system may include a plurality of the vessels arranged in series.

The or each concentrate outlet port of at least one of the vessels may be coupled to the inlet port of one or more other of the vessels.

The concentrate from at least one of the vessels may be fed to one or more other of the vessels in the filtration system and may be split between at the least two filtration elements.

The system may further include an energy recovery device coupled to the output of the vessel to receive the concentrate. A plurality of energy recovery devices may be provided.

The energy recovery device may be arranged to increase the pressure of the liquid feed to one of the plurality of vessels.

The energy recovery device may be arranged to recover energy from the concentrate of one of the plurality of vessels and transfer this to the liquid feed of the same vessel.

The energy recovery device may be arranged to recover energy from the concentrate of one of the plurality of vessels and transfer this to the liquid feed of one or more other of the vessels.

Any suitable energy recovery device may be used. For example, the energy recovery device may be a pressure exchanger. In particular, but not exclusively, the energy recovery device may comprise a turbocharger. A turbocharger may be used to provide a higher inlet pressure to one or more other vessel by exchanging energy between, for example, an exiting concentrate stream and an entering liquid feed. The inlet pressure actually needed may be reduced by about 10%, about 20%, about 40% or about 50% by using an energy recovery device such as a turbocharger. Pump pressure can be reduced from about 35 barg (3.6 MPa) to about 31 barg (3.2 MPa) by using a pressure exchanger. Although this may appear to be small, this may result in more cost effective pump selection. For example, in RO applications, up to about 60% recovery in energy is achievable. For nanofiltration, about a 16% improvement in energy recovery is achievable.

The system may include a plurality of energy recovery devices.

The system may include a plurality of the vessels arranged in parallel.

The inlet port may be located at an end of the respective vessel.

The at least two filtration elements may comprise at least one first filtration element and at least one second filtration element in series with the at least one first filtration element.

The second filtration element may comprise the nanofiltration or reverse osmosis membrane.

The first filtration element may comprise the ultrafiltration membrane or the microfiltration membrane.

At least one of the vessels may include a backwash port located between the at least two filtration elements.

A plurality of the vessels may include a backwash port, the backwash port of one of the vessels being coupled to a corresponding backwash port of at least one other vessel.

The backwash port of one of the vessels may be adapted to receive permeate from at least one of the first filtration elements of the at least two filtration elements of another of the vessels.

The system may comprise a further vessel containing a further filtration element.

The further filtration membrane may comprise a reverse osmosis membrane.

The further filtration element may comprise a nanofiltration membrane.

According to a second aspect of the present invention, there is provided a method of filtering a liquid feed, the method comprising the steps:

providing at least one vessel containing at least two filtration elements wherein one or more of the at least two filtration elements comprises a reverse osmosis membrane or a nanofiltration membrane and wherein one of the other at least two filtration elements comprises a microfiltration or ultrafiltration membrane;

providing an inlet port in the vessel and directing a liquid feed through the inlet port so that a liquid feed is provided to both of said at least two filtration elements;

providing at least one permeate outlet port and directing a permeate through the at least one permeate outlet port; and providing at least one concentrate outlet port and directing a concentrate through the at least one concentrate outlet port.

According to a third aspect of the present invention there is provided a filtration system comprising:
  a plurality of vessels, each of the vessels comprising:
    at least two filtration elements;
    an inlet port adapted to provide a liquid feed to the at least two filtration elements; and
    at least two outlet ports, at least one of the outlet ports being adapted to direct a permeate from the at least two filtration elements from the vessel and at least one other of the outlet ports being adapted to direct a concentrate from the at least two filtration elements from the vessel;
the system further comprising an energy recovery device for transferring energy from a concentrate produced by the filtration elements from one of the vessels to the liquid feed of the same vessel.

According to fourth aspect of the present invention there is provided a filtration system comprising:
  a plurality of vessels, each of the vessels comprising:
    at least two filtration elements;
    an inlet port adapted to provide a liquid feed to the at least two filtration elements; and
    at least two outlet ports, at least one of the outlet ports being adapted to direct a permeate produced from the filtration elements from the vessel and at least one other of the outlet ports being adapted to direct a concentrate produced by the filtration elements from the vessel;
the system further comprising an energy recovery device for transferring energy from the concentrate of one of the vessels to the liquid feed of one or more other of the vessels.

The liquid feed of one of the vessels may comprise the concentrate output of at least one other of the vessels.

According to a fifth aspect of the present invention there is provided a filtration system comprising:
  at least one vessel containing a filtration membrane and a reverse osmosis or nanofiltration element;
  wherein the filtration membrane is capable of removing particulates and/or suspended solids from reaching the reverse osmosis element, and the reverse osmosis or nanofiltration element is capable of reducing the concentration of ions in a liquid feed.

The system may be arranged to allow cleaning of the filtration membranes by backwashing.

A plurality of vessels may be provided in a parallel arrangement to one another with each vessel containing a filtration membrane and a reverse osmosis element.

The osmosis element may be located downstream of the filtration membrane. In alternative embodiments, there may be a plurality of reverse osmosis elements arranged in series in each vessel.

The system may also be designed to allow backwashing to allow the filtration membranes to be cleaned. For example, fluid may be directed between the filtration membrane and the reverse osmosis or nanofiltration element to backwash the filtration membrane.

The fluid may comprise the permeate of the filtration membranes of at least one of the other vessels.

BRIEF DESCRIPTION OF THE DRAWINGS

Embodiments of the present invention will now be described, by way of example only, with reference to the accompanying drawings in which.

DETAILED DESCRIPTION

Figure 1:
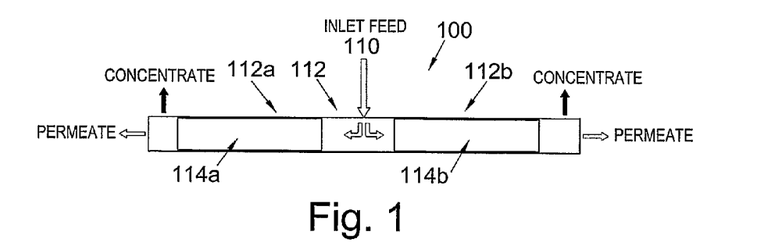
FIG. 1 is a representation of a membrane vessel arrangement according to a first embodiment of the present invention.

Referring initially to FIG. 1, there is shown a representation of a membrane vessel arrangement according to an embodiment of the present invention, generally designated 100 which may be used in nanofiltration or reverse osmosis (RO) systems. As shown in FIG. 1, there is an inlet feed 110 located on a vessel 112. The inlet feed 110 feeds liquid into a substantially central portion of the vessel 112. By feeding the liquid in this manner, the liquid is capable of passing both to the left and to the right into vessel parts 112a, 112b, respectively. Both vessel parts 112a, 112b contain membranes 114a, 114b which are used to remove divalent/mono ions such as sulphate and/or salts from the liquid.

By inputting the liquid at the centrally mounted inlet feed port 110, the liquid is substantially split into equal portions, providing a liquid feed in opposite directions in the vessel 112.

As liquid passes through the membranes 114a, 114b, concentrate and permeate can be separated and collected at both ends of vessel parts 112a, 112b. The concentrate and permeate are separated within the membranes 114a, 114b, with concentrate remaining on the feed side of the membrane and permeate collected via permeate tubes in a central collection tube (not shown). Although not shown, there may be a plurality of membranes in series, the concentrate from a first membrane acting as a feed to a second membrane until the concentrate finally exits the vessel. The permeate tubes of the membranes may be connected and combine to leave the vessel from the permeate port. The typical reduction in sulphate concentration is from 2800 parts per million (ppm) to below 50 ppm, in some embodiments below 1 ppm in the product. Operating pressure for sulphate removal is in the range of about 20 barg (2.1 MPa) to about 35 barg (3.6 MPa).

The diameter of the membranes 114a, 114b can be normal eight inch (203.2 mm) membranes. In alternative embodiments, the membranes can have a sixteen inch (406.4 mm) diameter (although other diameters can be used as well). The advantage of using sixteen inch (406.4 mm) membranes is that each 16 inch membrane replaces 4 off 8 inch (203.2 mm) membranes.

Figure 2:
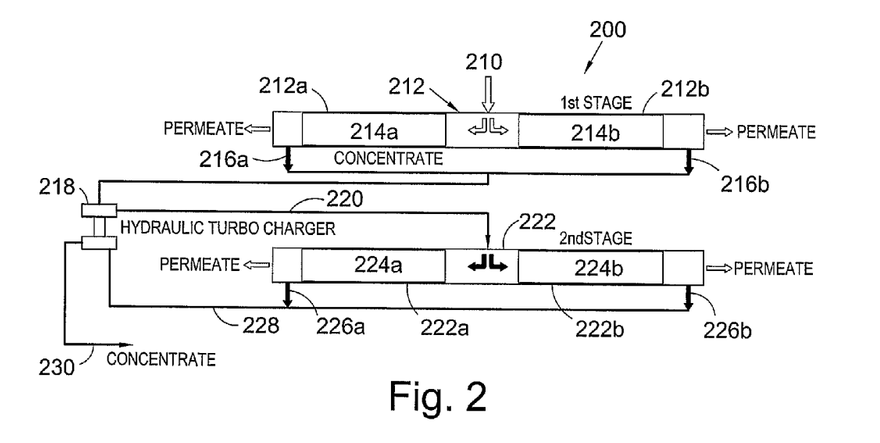
FIG. 2 is a representation of a membrane vessel arrangement according to a second embodiment of the present invention.

FIG. 2 is a representation of a further membrane vessel arrangement 200 according to an embodiment of the present invention which may be used in nanofiltration or reverse osmosis (RO) systems. In a similar manner to the membrane vessel arrangement 100 shown in FIG. 1, an inlet feed port 210 inputs liquid feed into a substantially central portion of a vessel 212. The liquid feed is then split in substantially opposite directions with liquid passing through two membranes 214a, 214b, respectively. This results in a first stage treatment. As shown in FIG. 2, permeate is collected at both ends of vessels parts 212a,212b. The collected concentrate passes through conduits 216a, 216b from both ends and passes through a hydraulic turbocharger 218.

The hydraulic turbocharger 218 is used to recover energy from the feed stream by taking waste energy from the concentrate stream (e.g. a brine stream) and using this to boost the system feed pressure. Various energy recovery devices are available on the market that could be used for this function. The hydraulic turbocharger is best suited for this function with operation as follows. High pressure concentrate from conduits 216a, 216b enters the turbocharger 218. A 2nd stage concentrate stream 228 enters the turbocharger 218 and conveys energy from stream 228 to the turbocharger 218, which in turn passes this on to stream 216, to give an increased pressure in stream 220.

As shown in FIG. 2, liquid leaving the hydraulic turbocharger 218 exits along conduit 220 into a further vessel 222 for a 2nd stage treatment. Once again, the liquid feed is fed in at a substantially central portion of the vessel 222 and is split in substantially opposite directions to pass through membranes 224a, 224b located in vessel parts 222a, 222b, respectively. There may be more than one or a plurality of membranes. As before, permeate may be collected at both ends of the vessel parts 222a, 222b, with concentrate exiting via conduits 226a, 226b. The concentrate then passes along conduit 228 via the hydraulic turbocharger 218 and exits via conduit 230.

The membranes 214a, 214b, 224a, 224b in FIG. 2, may be sixteen inch (406.4 mm) diameter membranes. Although not shown in FIG. 2, each membrane housing may house eight off membrane elements (four on each side of the feed port).

Prior art nanofiltration plants are usually arranged in a two-staged array to increase efficiency of water recovery, with the concentrate from the first stage acting as a feed to the second stage. In the second stage, the higher concentration feed requires a higher inlet pressure to maintain production. This is generally done in the prior art by applying a first stage back pressure to the first stage permeate and thereby forcing more water through the second stage. However, a significant disadvantage of prior art systems is that this requires an increase in the feed pumping pressure.

The present invention as shown in FIG. 2 overcomes this disadvantage by using a hydraulic turbocharger 218 to provide a higher inlet pressure to the second stage, by exchanging energy between the exiting second stage concentrate stream and the entering second stage feed. This reduces the energy requirement for the main high pressure feed pump. For sulphate removal applications, feed pressure can be reduced from about 35 barg (3.6 MPa) to about 31 barg (3.2 MPa) by using a pressure exchanger. Although small, this may result in more cost effective pump selection. For RO applications, up to about a 60% recovery in energy is achievable. For nanofiltration, about a 16% improvement in energy recovery is achievable.

Figure 3:
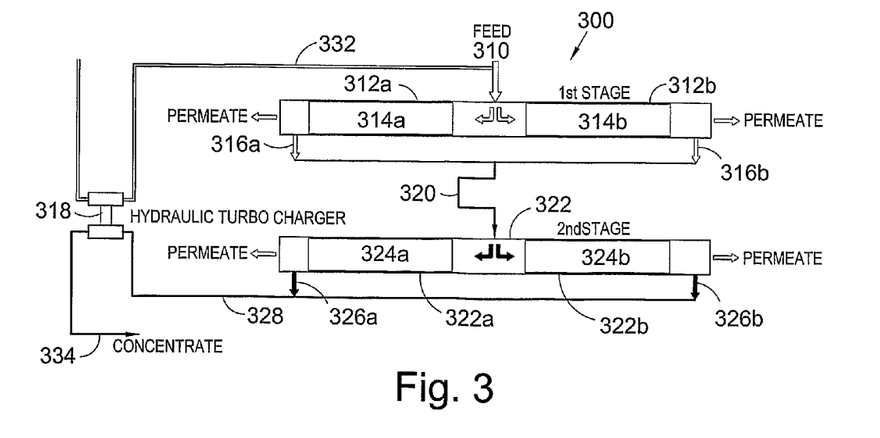
FIG. 3 is a representation of a membrane vessel arrangement according to a third embodiment of the present invention.

FIG. 3 is a further membrane vessel arrangement 300 according to an embodiment of the present invention which may be used in nanofiltration or reverse osmosis (RO) systems. In a similar manner to the previous embodiments, there is an inlet feed port 310 which feeds liquid into a substantially central portion of a vessel 312 wherein the liquid is substantially split in opposite directions to pass along vessel parts 312a, 312b. Each of vessel parts 312a, 312b contains a membrane 314a, 314b which provides a permeate and a concentrate from the inputted liquid. There may be more than one or a plurality of membranes. The concentrate from both ends of the vessels 312a, 312b passes along conduits 316a, 316b and then along a further conduit 320 which acts as a further substantially centrally mounted inlet feed for a vessel 322. Vessel 322 contains two vessel parts 322a, 322b which each comprise a membrane 324a, 324b, respectively. Once again, there may be more than one or a plurality of membranes. A further permeate and concentrate is provided from the 2nd stage treatment. The concentrate exits via conduits 326a, 326b and then passes via conduit 328 into a hydraulic turbocharger 318. The hydraulic turbocharger 318 also has a conduit 332 running off from the inlet feed port 310. The concentrate then exits via conduit 334.

The membrane vessel arrangement 300 is therefore similar to the previous embodiments but the feed water pressure is increased by transfer of pressure between the high pressure concentrate passing via conduit 328 and the inlet water feed passing along conduit 332. For sulphate removal applications, feed pressure can be reduced from about 35 bar to about 31 bar by using a pressure exchanger. Although this may appear small, this results in a more cost effective pump selection. For RO applications, up to about 60% recovery in energy is achievable. For nanofiltration, about a 16% improvement in energy recovery is achievable.

Figure 4:
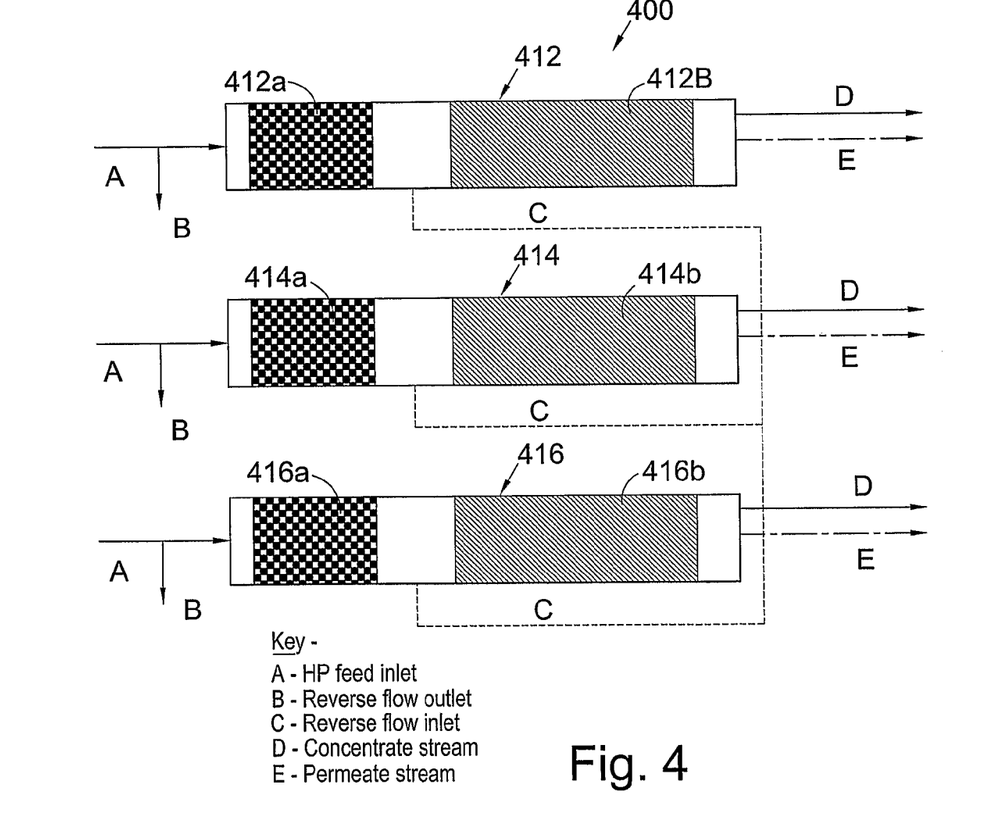
FIG. 4 is a representation of a membrane vessel arrangement according to a fourth embodiment of the present invention.

FIG. 4 represents a further membrane vessel arrangement 400 according to an embodiment of the present invention. As shown in FIG. 4, there are three vessels 412, 414, 416 in a parallel arrangement. (In alternative embodiments there may be more than one or a plurality of vessels in parallel such as 4, 5, 6, 7, 8, 9 or 10 membranes.) The vessels 412, 414, 416 each comprise a membrane 412a, 414a, 416a which is a microfiltration/ultrafiltration (MF/UF) membrane. There may be more than one or a plurality of membranes in each vessel. In series with the or each MF/UF membrane 412a, 414a, 416a, there is a reverse osmosis (RO) element 412b, 414b, 416b. The MF/UF membranes 412a, 414a, 416a are used to remove particulates and suspended solids from feed water prior to reaching the downstream RO elements 412b, 414b, 416b. The RO elements 412b, 414b, 416b may consist of single or multiple elements arranged in series in each vessel.

The MF/UF membranes 412a, 414a, 416a are rated for high pressure operation to suit the downstream RO/NF membrane 412b, 414b, 416b requirements.

Feed water may be routed into the feed side of the vessel at stream A and be treated by the MF/UF membranes 412a, 414a, 416a. In the embodiment shown, the membranes 412a, 414a, 416a operate in a 'dead-end' mode (e.g. all water entering the membranes 412a, 414a, 416a leaves as filtrate product, with solids retained on the membrane surfaces). However, it will be understood that the system may also be used in cross-flow. The MF/UF filtrate is fed directly into the RO or NF elements 412b, 414b, 416b allowing production of permeate low in dissolved salts (i.e. stream D). The dissolved salts rejected by the RO/NF elements 412,414b, 416b are routed to drain in the brine concentrate stream and are represented as stream E. The membrane vessel arrangement 400 in FIG. 4 may also be used to perform backwashing. With time, solids may build up to a level where the MF/UF membranes 412a, 414a, 416a become partially clogged and may need to be cleaned. Cleaning may be achieved by linking the MF/UF filtrate of a bank of parallel vessels to each other (stream C).

A MF/UF membrane from a particular vessel is cleaned by opening a backwash outlet line for the particular vessel as represented by stream B and isolating the inlet stream as represented by stream A to the vessel. The MF/UF filtrate from the common filtrate header for the bank represented by stream C is used to provide a reverse flow from the MF/UF membrane outlet to the inlet, thereby allowing debris to be lifted from the MF/UF membrane surface and swept to a drain.

During the MF/UF cleaning process, the respective vessel being cleaned continues to produce RO permeate by receiving MF/UF filtrate from a common MF/UF product header as represented by stream C. To enable this, the remaining MF/UF membranes in the bank increase production during cleaning to maintain final RO permeate production.

The membrane vessel arrangement 400 shown in FIG. 4 may be used in the previous embodiments described in FIGS. 1 to 3.

Figure 5:
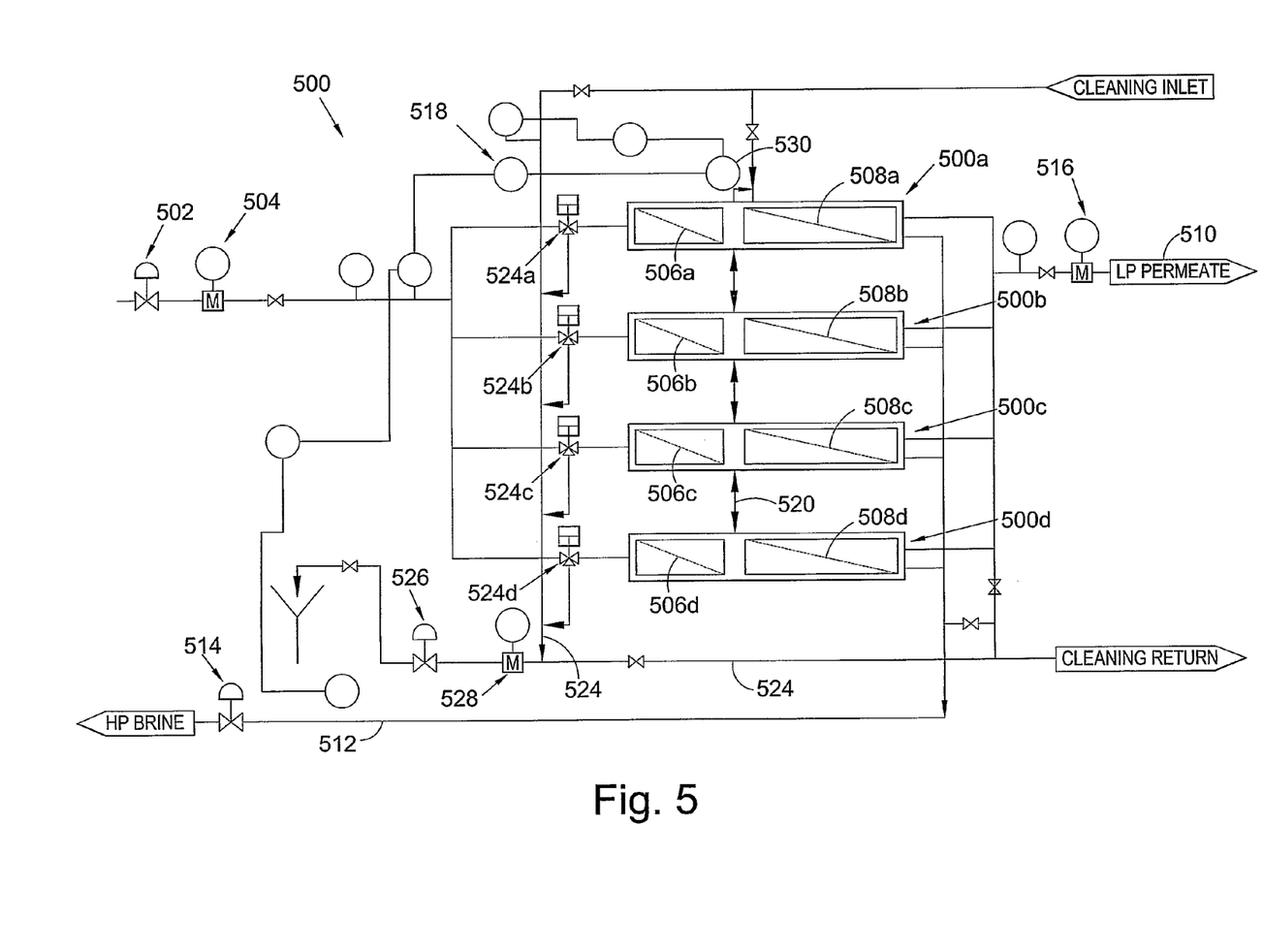
FIG. 5 is a representation of a membrane vessel arrangement according to a fifth embodiment of the present invention.

FIG. 5 is a further membrane vessel arrangement 500 according to an embodiment of the present invention which may be used in nanofiltration (NF) or reverse osmosis (RO) systems.

As shown in FIG. 5, a system according to this embodiment comprises four vessels 500a, 500b, 500c and 500d arranged in a parallel configuration.

Feed liquid enters the system 500 via a flow control valve 502 with the flow rate through the flow control valve 502 monitored via a flow sensor 504. The flow control valve 502 is opened until the flow rate reaches the desired level.

The vessels 500a, 500b, 500c and 500d each include a membrane which includes a microfiltration/ultrafiltration (MF/UF) membrane 506a, 506b, 506c and 506d. It will be recognised that a plurality of MF/UF membranes 506a, 506b, 506c and 506d may be provided in each vessel.

In use, the feed liquid is passed through the MF/UF membranes 506a, 506b, 506c and 506d to remove particulates and other suspended solids from the feed liquid. The feed liquid is thus subjected to a $1^{st}$ stage filtration treatment.

A reverse osmosis or nanofiltration (RO/NF) membrane 508a, 508b, 508c, 508d is provided in series with the respective MF/UF membrane 506a, 506b, 506c and 506d in each vessel 508a, 508b, 508c, 508d and, in use, permeate from the $1^{st}$ stage treatment is directed to the RO/NF membranes 508a, 508b, 508c, 508d in order to perform a $2^{nd}$ stage filtration treatment. A permeate which is low in dissolved salts is produced from the $2^{nd}$ stage treatment and exits the system 500 via an outlet stream conduit 510.

The rejected liquid from the $2^{nd}$ stage membranes is high in dissolved salts and is discharged from the system 500 via a brine stream conduit 512.

Permeate recovery from the system 500 is adjusted by adjusting a control valve 514 located on the brine stream conduit 512 and the permeate flow rate is monitored by a flow sensor 516 on the outlet conduit 510.

It will be recognised that, over time, suspended solids material may collect on the surfaces of the $1^{st}$ stage membranes 506a, 506b, 506c and 506d. Collection of material on the respective $1^{st}$ stage membrane 506a, 506b, 506c and 506d is identified by an increase in differential pressure across the $1^{st}$ stage membranes 506a, 506b, 506c and 506d and a sensor 518 located across the $1^{st}$ stage membranes 506a, 506b, 506c and 506d may be used to measure the differential pressure.

In order to prevent blockage, it is required to remove the collected material from the surface of the membranes 506a, 506b, 506c and 506d. Thus, when the pressure differential measured by the pressure sensor 518 exceeds a selected value, a backwash is activated. Alternatively, or in addition, backwashing may be initiated by a timer (not shown).

In use, one of the $1^{st}$ stage membranes 506a, 506b, 506c and 506d is cleaned by introducing a reverse liquid flow through one of the $1^{st}$ stage membranes 506a, 506b, 506c and 506d. The reverse flow is achieved by directing flow from one or more of the other membrane vessels 506a, 506b, 506c and 506d via an interconnecting conduit 520. The interconnecting conduit 520 is provided between the respective $1^{st}$ and $2^{nd}$ stages of the or each other membrane vessel 500a, 500b, 500c and 500d.

All of the $2^{nd}$ stage membranes 508a, 508b, 508c and 508d may remain in service as each will receive permeate from the MF/UF membranes 506a, 506b, 506c and 506d that remain in normal operation.

As the backwash liquid contains high levels of suspended solids, this is subsequently discharged from the system 500 via a drain 522. Directional control valves 524a, 524b, 524c and 524d located at the inlets of each membrane vessel 500a, 500b, 500c and 500d to be cleaned is movable between a first position which permits liquid to enter the vessel and a second position which prevents liquid feed from entering the respective membrane vessel 500a, 500b, 500c and 500d and which couples the reverse flow through the $1^{st}$ stage membrane 506a, 506b, 506c and 506d to a cleaning stream conduit 524. The cleaning stream conduit 524 is formed into a loop and a cleaning stream is circulated around the cleaning conduit 524. In use, the cleaning stream is provided to assist in directing the backwash material to the drain 522.

A flow control valve 526 is provided on the cleaning stream conduit 524 for providing control over the flow rate to the drain 522. A sensor 528 is provided which allows the flow rate through the flow control valve 526 to be monitored.

The pressure across the membrane 506a, 506b, 506c and 506d during backwashing is measured by a sensor 530.

In the embodiment shown in FIG. 5, on initiation of a backwash, only one MF/UF membrane 506a, 506b, 506c and 506d is backwashed at a time. In alternative embodiments, more than one MF/UF membrane 506a, 506b, 506c and 506d may be backwashed simultaneously, or in a staggered backwash operation, where required especially where there are a large number of membranes for example more than 10. Thus, by controlling the MF/UF trans membrane pressure; the backwash transmembrane pressure; and the feed-brine differential pressure, the system 500 may be controlled effectively.

During backwashing, the inlet flow rate to the system 500 is increased to maintain the permeate flow rate.

Where initiated by a timer (not shown), when the timer cycle completes, the backwash control valve 526 closes and the inlet flow rate decreases accordingly to the normal feed flow rate.

The increased feed flow demand increases the flow through the remaining MF/UF membranes 506a, 506b, 506c and 506d, which in turn provides permeate to all the downstream RO/NF membranes 508a, 508b, 508c and 508d, as well as backwash source liquid to the MF/UF membrane 506a, 506b, 506c and/or 506d being backwashed.

When the backwash on the membrane vessel 500a, 500b, 500c or 500d to be cleaned is completed, the same procedure may be applied in turn to the remaining membrane vessels 506a, 506b, 506c and/or 506d.

During any part of the sequence chemicals may be injected into one or more of the liquid streams to increase system efficiency.

The membrane vessel arrangement 500 shown in FIG. 5 may be used in the previous embodiments described in FIGS. 2 to 4. For example, two membrane vessels of the type shown in FIG. 6 may be arranged within a vessel housing with a space therebetween. Feed liquid may be directed to the space and split between the membrane vessels.

Figure 6:
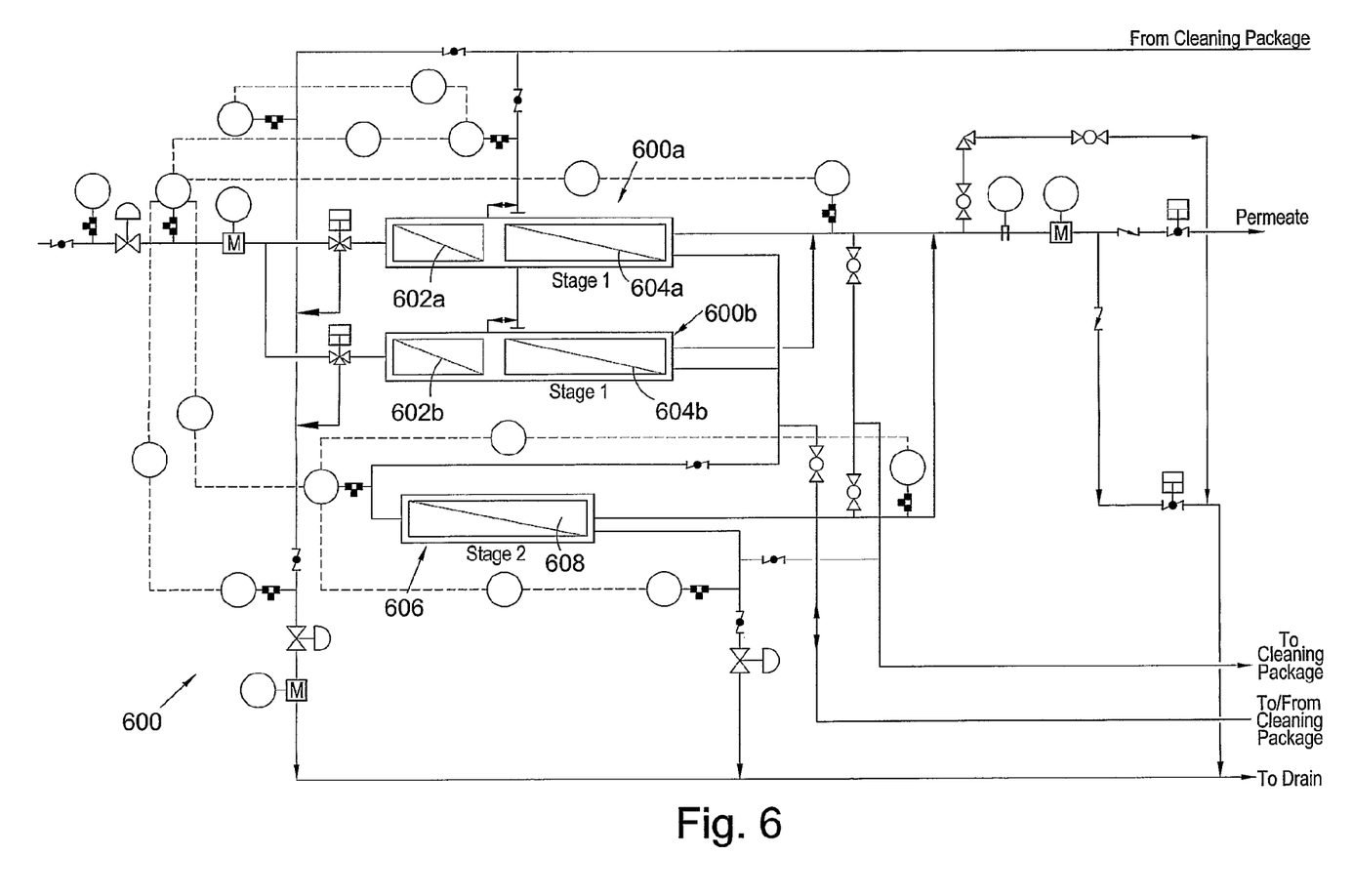
FIG. 6 is a representation of a membrane vessel arrangement according to a sixth embodiment of the present invention.

In reference now to FIG. 6 of the drawings, there is shown a further membrane vessel arrangement 600 according to another embodiment of the present invention. The embodiment shown in FIG. 6 is substantially similar to the embodiment of FIG. 5. In this embodiment, the system comprises two vessels 600a, 600b each vessel containing two filtration elements in the form of a MF/UF filtration membrane 602a, 602b, and a RO/NF membrane 604a, 604b. In use, the MF/UF membrane 602a, 602b provides a $1^{st}$ or pre-treatment stage to remove particulate matter and the RO/NF membrane 604a, 604b provides a $2^{nd}$ stage treatment.

The system further comprises a third vessel 606 containing a further filtration element in the form of a RO/NF membrane 608. In use, the further element 608 provides $3^{rd}$ stage treatment on the liquid feed. It will be understood that more than one further filtration element may be provided.

Whilst specific embodiments of the present invention have been described above, it will be appreciated that departures from the described embodiments may still fall within the scope of the present invention. For example, any suitable means for splitting an inlet feed may be used such as a funneling or pipe based system that provides more than one liquid stream. Additionally, any suitable number and arrangement of vessels and membranes may be used in the embodiments of the present invention.

EXAMPLES

Example 1

Figure 7:
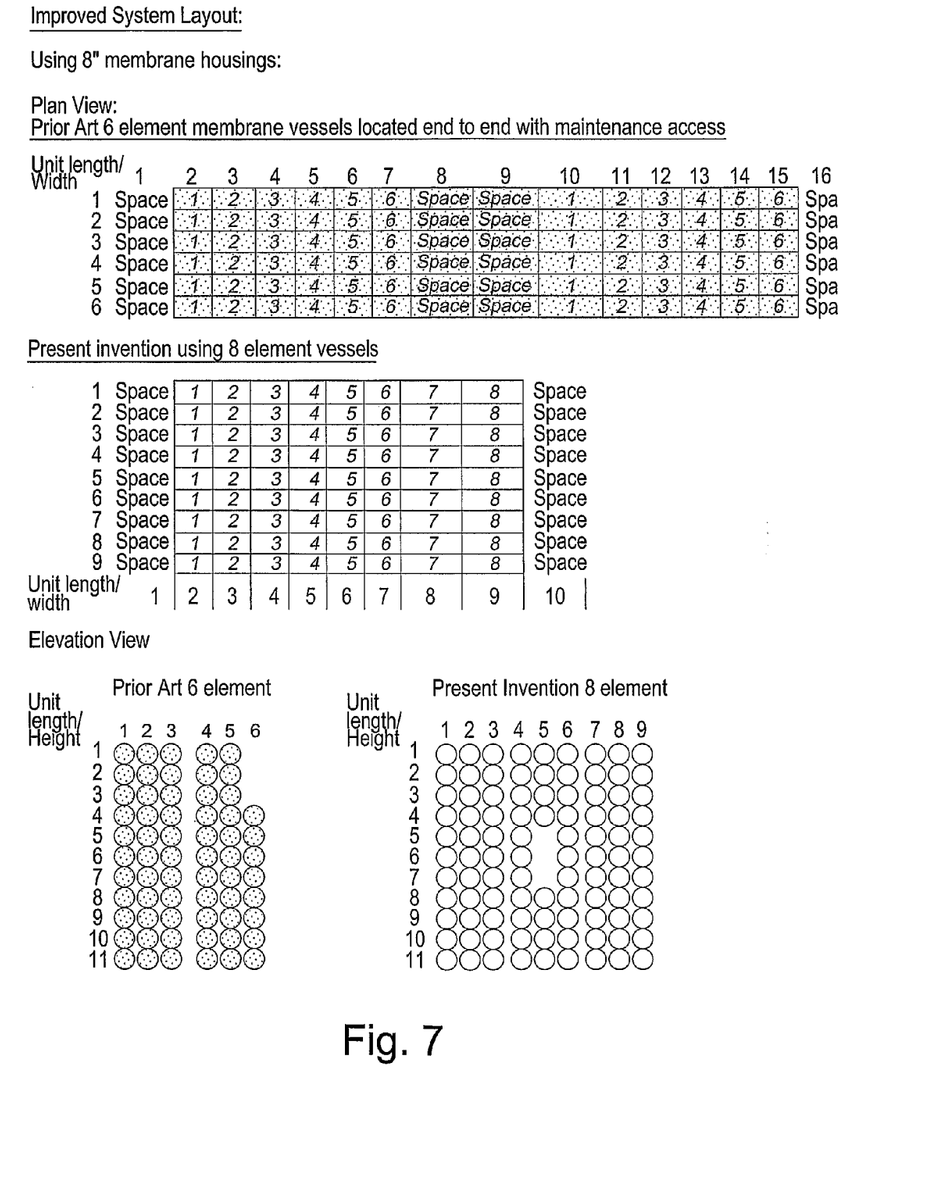
FIG. 7 is a representation of layouts of the present invention and the prior art layouts for ease of comparison.

FIG. 7 represents a comparison of a membrane vessel arrangement using eight element vessels according to the present invention with a prior art arrangement of six element membrane vessels located end to end.

As shown in FIG. 7, the membrane vessel arrangement according to the present invention has a significant reduction in footprint with a volume of 990 compared to the prior art arrangement of 1056. This is extremely important when working offshore where space on oil platforms is extremely limited.

FIG. 7 shows that prior art eight inch (203.2 mm) systems have a volume of 1056 and sixteen inch (406.4 mm) systems have a volume of 896. In contrast, using the arrangements of the present invention, a significant saving in volume may be found with the present invention eight inch (203.2 mm) system units having a volume of 990 and the sixteen inch (406.4 mm) system having a volume of 480. As will be understood, these are significant space saving reductions.

Example 2

Improved Power Consumption

In this Example, we have used the membrane vessel arrangement 200 shown in FIG. 2.

Using Hydraulic Turbocharger (HTC) for the following conditions:

| | |
|---|---|
| $1^{st}$ stage membrane pressure requirement: | 28 barg (2.9 MPa) |
| $1^{st}$ stage concentrate outlet pressure: | 25.5 barg (2.65 MPa) |
| $2^{nd}$ stage inlet pressure requirement: | 31.5 barg (3.25 MPa) |
| $2^{nd}$ stage concentrate outlet pressure: | 23 barg (2.4 MPa) (without boost) |
| System recovery: | 75% |
| Pump Efficiency (Hydraulic): | 75% |
| Pump Motor efficiency: | 90% |
| HTC Efficiency: | 74.3% |
| HTC Pressure boost: | 6.2 barg (0.72 MPa) |

Based on 100 m3/h system feed flow:

| | KW | kW/m3 |
|---|---|---|
| Pump power without HTC | 147.8 | 1.48 |
| Pump power with HTC | 135.4 | 1.35 |
| Saving with HTC | | 8.4% |

There is therefore a power saving of 8.4% by using a hydraulic turbocharger.

Example 3

Improved Power Consumption

Using the membrane vessel arrangement shown in FIG. 3, improved power consumption is found.

Using a Hydraulic Turbocharger (HTC) for the following conditions:

| | |
|---|---|
| Inlet membrane pressure requirement: | 35 barg (3.6 MPa) |
| Concentrate outlet pressure: | 31 barg (3.1 MPa) |
| System recovery: | 75% |
| Pump Efficiency (Hydraulic): | 75% |
| Pump Motor efficiency: | 90% |
| HTC Efficiency: | 74.3% |
| HTC Pressure boost: | 4.6 barg (0.56 MPa) |

Based on 100 m3/h system feed flow:

| | KW | kW/m3 |
|---|---|---|
| Pump power without HTC | 147.8 | 1.48 |
| Pump power with HTC | 128.3 | 1.32 |
| Saving with HTC | | 11% |

There is therefore a power saving of 11% using a hydraulic turbocharger.

Summary

Some improvements using the membrane vessel arrangements according to the present invention are summarised as follows:

| | Present Invention | System with Cartridge filter pre-treatment only | System with Media filter pretreatment |
|---|---|---|---|
| Area Calculation | | | |
| Media Filters | — | — | 157 m2 |
| Cartridge Filters | — | 44 m2 | 44 m2 |
| SRU Pumps | 108 m2 | 108 m2 | 108 m2 |
| CIP | 22 m2 | 22 m2 | 22 m2 |
| Membrane Trains | 162 m2 | 149 m2 | 149 m2 |
| Total | 292 m2 (~40% Reduction) | 323 m2 | 480 m2 |
| % larger than present invention | | 10% | 39% |
| Energy Calculation | | | |
| Energy Required (kWh) | 1980 | 2220 | 2220 |
| Energy Saving (%) compared to prior art | — | 10.8% | 10.8% |

-continued

|  | Present Invention | System with Cartridge filter pre-treatment only | System with Media filter pretreatment |
|---|---|---|---|
| Weight Calculation | | | |
| Estimated Weight (tonnes) | 520 | 560 | 772 |
| Weight Saving (%) compared to prior art | — | 7% | 32.6% |

The filtration system according to embodiments of the present invention provides a number of advantages such as:
1. By using a vessel with eight off membranes in series, the overall package footprint and weight can be substantially reduced up to 40%.
2. By using a sixteen inch (406.4 mm) vessel the number of membranes, and overall space requirement on the plant is significantly reduced i.e. at least 30% volume reduction.
3. The use of a turbocharger or other energy recovery device reduces overall pumping power.
4. The use of the turbocharger removes the need for a brine control valve.

Furthermore, it will be recognised that the filtration system according to embodiments of the present invention can be modular in construction and can therefore be adapted to suit any footprint, or location during initial construction and planning or where it is necessary to adapt the requirements of the filtration system over time. A modular system also has the benefit of permitting components to be easily removed for disposal and/or replacement.

In addition, the vessels of the system can be arranged in a parallel arrangement, a series arrangement or a combination of series and parallel arrangements, where required. This provides additional flexibility in the layout of the filtration system and permits the quality of output from the system to be tailored to the required standard.

Accordingly, it will be recognised that the filtration system according to embodiments of the present invention provides a number of advantages including reducing the footprint of a filtration system, reducing the weight and volume occupied by a filtration system, reducing the energy consumption and increasing the energy efficiency of a filtration system while providing a system which is of reduced cost and which is capable of filtering particles and/or ions to a specified level of output quality, for example in the region of 50 ppm sulphates and others or less.

The obtained liquid, for example water may be used in many applications where purification is required such as irrigation, drinking water (potable), industrial and pharmaceutical applications.

It should be understood that the embodiments described are merely exemplary of the present invention and that various modifications may be made without departing from the scope of the invention.

For example, the or each vessel can be of any suitable dimensions or shape as required. The liquid feed may be directed into the or each vessel at any location, for example at an end or at any point between the ends where required.

The seal elements may comprise any suitable seal element and may be of any suitable cross-sectional area.

While the backwashing procedure is described in particular in relation to the embodiments in FIGS. 5 and 6, it will be understood that backwashing can be used to clean one or more membrane in any of the other embodiments of the present invention, where necessary or desired.

The invention claimed is:

1. A filtration system comprising:
a plurality of vessels, at least one of the vessels containing at least one first filtration element comprising a chosen one of an ultrafiltration membrane and a microfiltration membrane, the first filtration element being in series with at least one second filtration element comprising a chosen one of a reverse osmosis membrane and a nanofiltration membrane, the vessel comprising:
an inlet port for providing a liquid feed to the filtration elements;
at least one outlet port for directing a permeate produced by the elements from the vessel;
at least one outlet port for directing a concentrate produced by the elements from the vessel; and
a backwash port for receiving permeate from at least one other of the plurality of the vessels, the permeate received from the at least one other vessel being directed simultaneously to the at least one first filtration element and to the at least one second filtration element, and wherein the vessel is configured to concurrently direct the permeate received from the at least one other vessel to the at least one first filtration element in a reverse flow direction and to the at least one second filtration element in a forward flow direction.

2. The filtration system of claim 1, wherein the system includes a plurality of the vessels arranged in parallel.

3. The filtration system of claim 1, wherein the backwash port is located between the at least one first filtration element and the at least one second filtration element.

4. The filtration system of claim 1, further comprising an energy recovery device coupled to the concentrate outlet port of the vessel receiving the concentrate from one or more other of the vessels.

5. The filtration system of claim 4, wherein the energy recovery device is arranged to recover energy from the concentrate output from the vessel receiving concentrate from one or more other of the vessels and transfer this energy to the liquid feed of the same vessel.

6. The filtration system of claim 4, wherein the energy recovery device is arranged to recover energy from the concentrate output from the vessel receiving concentrate from one or more other of the vessels and transfer this energy to the liquid feed of one or more other of the vessels.

7. The filtration system of claim 1, wherein the system comprises a further vessel containing a further filtration element, the further filtration element comprising a reverse osmosis membrane or a nanofiltration membrane.

8. The filtration system of claim 1, further comprising a header for supplying the permeate to the backwash port.

9. The filtration system of claim 8, wherein the header is coupled to a plurality of vessels so that the permeate may be supplied from at least one of a plurality of other vessels.

10. The filtration system of claim 1, wherein the vessel is configured so that the elements of the vessel continue to produce permeate while permeate is being received by the vessel from the at least one other vessel.

11. A method of filtering a liquid feed, the method comprising the steps of:
providing a vessel containing at least one first filtration element comprising a chosen one of an ultrafiltration membrane and a microfiltration membrane, the first filtration element being in series with at least one second filtration element comprising a chosen one of a reverse osmosis membrane and a nanofiltration membrane;

providing an inlet port in the vessel and directing a liquid feed through the inlet port so that a liquid feed is provided to both of the filtration elements;

providing at least one permeate outlet port and directing a permeate through the at least one permeate outlet port;

providing at least one concentrate outlet port and directing a concentrate through the at least one concentrate outlet port;

providing a backwash port for receiving permeate from at least one other vessel; and simultaneously directing the permeate received from the at least one other vessel to the at least one first filtration element and to the at least one second filtration element, wherein the permeate received by the backwash port from the at least one other vessel is concurrently directed to the at least one first filtration element in a reverse flow direction and to the at least one second filtration element in a forward flow direction.

12. The method of claim 11, comprising providing a plurality of vessels, wherein at least one of the vessels is provided with the backwash port for receiving permeate from at least one of the other vessels and fluid is directed through the backwash port to clean the at least one first filtration element.

13. The method of claim 12, wherein fluid is directed through the backwash port to be filtered by the at least one second filtration element.

14. The method of claim 11, wherein the elements of the vessel continue to produce permeate while permeate is being received by the vessel from the at least one other vessel.

15. A vessel for a filtration system, the vessel comprising:

at least one first filtration element comprising a chosen one of an ultrafiltration membrane and a microfiltration membrane, the first filtration element being in series with at least one second filtration element comprising a chosen one of a reverse osmosis membrane and a nanofiltration membrane;

an inlet port for providing a liquid feed to the filtration elements;

at least one outlet port for directing a permeate produced by the elements from the vessel;

at least one outlet port for directing a concentrate produced by the elements from the vessel; and a backwash port for receiving permeate from at least one other vessel, the permeate received from the at least one other vessel being simultaneously directed to the at least one first filtration element and to the at least one second filtration element, wherein the vessel is configured to concurrently direct permeate received from the at least one other vessel to the at least one first filtration element in a reverse flow direction and to the at least one second filtration element in a forward flow direction.

16. The vessel of claim 15, wherein the vessel is configured so that the elements of the vessel continue to produce permeate while permeate is being received by the vessel from the at least one other vessel.

* * * * *